(12) United States Patent
Eom et al.

(10) Patent No.: US 11,133,551 B2
(45) Date of Patent: Sep. 28, 2021

(54) BATTERY PACK (71) Applicant: LG CHEM, LTD., Seoul (KR)

(72) Inventors: Young-Sop Eom, Daejeon (KR); Jun-Yeob Seong, Daejeon (KR); Ki-Youn Kim, Daejeon (KR); Sung-Chun Yu, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 110 days.

(21) Appl. No.: 16/439,222

(22) Filed: Jun. 12, 2019

(65) Prior Publication Data
US 2019/0296292 A1    Sep. 26, 2019

Related U.S. Application Data

(63) Continuation of application No. 15/030,662, filed as application No. PCT/KR2014/011423 on Nov. 26, 2014, now Pat. No. 10,367,179.

(30) Foreign Application Priority Data

Nov. 29, 2013    (KR) ........................ 10-2013-0147810

(51) Int. Cl.
*B60L 50/64* (2019.01)
*B60L 50/60* (2019.01)
(Continued)

(52) U.S. Cl.
CPC ............. *H01M 50/20* (2021.01); *B60L 50/64* (2019.02); *H01M 10/425* (2013.01); *H01M 10/482* (2013.01); *H01M 50/10* (2021.01); *H01M 50/209* (2021.01); *B60L 2270/145* (2013.01); *H01M 2010/4271* (2013.01); *Y02T 10/70* (2013.01); *Y10S 903/907* (2013.01)

(58) Field of Classification Search
None
See application file for complete search history.

(56) References Cited

U.S. PATENT DOCUMENTS

| 6,379,837 B1 | 4/2002 | Takahashi et al. |
| 6,410,185 B1 | 6/2002 | Takahashi et al. |
| (Continued) | | |

FOREIGN PATENT DOCUMENTS

| EP | 1030388 A1 | 8/2000 |
| KR | 10-2006-0027277 A | 3/2006 |
| (Continued) | | |

OTHER PUBLICATIONS

International Search Report, issued in PCT/KR2014/011423, dated Feb. 27, 2015.

*Primary Examiner* — Yoshitoshi Takeuchi
(74) *Attorney, Agent, or Firm* — Birch, Stewart, Kolasch & Birch, LLP (57) ABSTRACT

A battery pack, including a cell assembly including a plurality of secondary batteries and having outer protrusions formed at an outer side surface thereof to extend vertically and a pack housing configured to have an inner space in which the cell assembly is accommodated, the pack housing having inner protrusions formed at an inner side surface thereof to extend vertically, wherein the cell assembly has ducts provided at both side surfaces thereof so that fluid flows into or out of a secondary battery, and the outer protrusions are formed at outer side surfaces of the ducts.

13 Claims, 7 Drawing Sheets

(51) Int. Cl.

| | | |
|---|---|---|
| *B60L 50/50* | (2019.01) | |
| *H01M 50/20* | (2021.01) | |
| *H01M 50/202* | (2021.01) | |
| *H01M 50/204* | (2021.01) | |
| *H01M 50/207* | (2021.01) | |
| *H01M 50/209* | (2021.01) | |
| *H01M 50/211* | (2021.01) | |
| *H01M 50/213* | (2021.01) | |
| *H01M 50/216* | (2021.01) | |
| *H01M 50/218* | (2021.01) | |
| *H01M 50/22* | (2021.01) | |
| *H01M 50/222* | (2021.01) | |
| *H01M 50/224* | (2021.01) | |
| *H01M 50/227* | (2021.01) | |
| *H01M 50/229* | (2021.01) | |
| *H01M 50/231* | (2021.01) | |
| *H01M 50/233* | (2021.01) | |
| *H01M 50/236* | (2021.01) | |
| *H01M 50/238* | (2021.01) | |
| *H01M 50/24* | (2021.01) | |
| *H01M 50/242* | (2021.01) | |
| *H01M 50/244* | (2021.01) | |
| *H01M 50/247* | (2021.01) | |
| *H01M 50/249* | (2021.01) | |
| *H01M 50/251* | (2021.01) | |
| *H01M 50/253* | (2021.01) | |
| *H01M 50/262* | (2021.01) | |
| *H01M 50/264* | (2021.01) | |
| *H01M 50/267* | (2021.01) | |
| *H01M 50/271* | (2021.01) | |
| *H01M 50/273* | (2021.01) | |
| *H01M 50/276* | (2021.01) | |
| *H01M 50/278* | (2021.01) | |
| *H01M 50/28* | (2021.01) | |
| *H01M 50/282* | (2021.01) | |
| *H01M 50/284* | (2021.01) | |
| *H01M 50/287* | (2021.01) | |
| *H01M 50/289* | (2021.01) | |
| *H01M 50/291* | (2021.01) | |
| *H01M 50/293* | (2021.01) | |
| *H01M 50/296* | (2021.01) | |
| *H01M 50/298* | (2021.01) | |
| *H01M 10/625* | (2014.01) | |
| *H01M 10/613* | (2014.01) | |
| *H01M 50/10* | (2021.01) | |
| *H01M 10/42* | (2006.01) | |
| *H01M 10/48* | (2006.01) | |

(56) References Cited

U.S. PATENT DOCUMENTS

| | | |
|---|---|---|
| 2002/0022159 A1 | 2/2002 | Pierson et al. |
| 2004/0033415 A1 | 2/2004 | Chen et al. |
| 2010/0151299 A1 | 6/2010 | Ha et al. |
| 2011/0003193 A1 | 1/2011 | Park et al. |
| 2012/0015226 A1 | 1/2012 | Kim et al. |

FOREIGN PATENT DOCUMENTS

| | | |
|---|---|---|
| KR | 10-2008-0025429 A | 3/2008 |
| KR | 10-0875579 B1 | 12/2008 |
| KR | 10-2011-0093703 A | 8/2011 |
| KR | 10-2013-0123901 A | 11/2013 |
| WO | WO 2013/162228 A1 | 10/2013 |

BATTERY PACK

CROSS-REFERENCE TO RELATED APPLICATIONS

This application is a Continuation of U.S. patent application Ser. No. 15/030,662 filed on Apr. 20, 2016, which was filed as the National Phase of PCT International Application No. PCT/KR2014/011423 filed on Nov. 26, 2014, which claims the benefit of priority to Korean Patent Application No. 10-2013-0147810 filed on Nov. 29, 2013, all of which are hereby expressly incorporated by reference into the present application.

BACKGROUND OF THE INVENTION

Field of the Invention

The present application claims priority to Korean Patent Application No. 10-2013-0147810 filed on Nov. 29, 2013 in the Republic of Korea, the disclosures of which are incorporated herein by reference.

The present disclosure relates to a battery pack including a plurality of secondary batteries, and more particularly, to a battery pack which may allow easily assembling between a cell assembly including a plurality of secondary batteries and a pack housing accommodating the cell assembly and also ensure rigidity thereof, and a vehicle comprising the battery pack.

Description of the Related Art

Recently, the demand for portable electronic products such as notebooks, video cameras, cellular phones or the like has rapidly increased, and electric vehicles, energy storage batteries, robots, satellites have been actively developed. For this reason, high-performance secondary batteries allowing repeated charging and discharging are being actively studied.

Currently, nickel-cadmium batteries, nickel-metal hydride batteries, nickel-zinc batteries, lithium secondary batteries, and the like are used as commercial secondary batteries. Among them, lithium secondary batteries have little to no memory effect in comparison with nickel-based secondary batteries, and thus lithium secondary batteries are gaining a lot of attention for their advantages of free charging or discharging, low self-discharging, and high energy density.

A lithium secondary battery generally uses lithium oxide and carbonaceous material as a positive electrode active material and negative electrode active material, respectively. The lithium secondary battery includes an electrode assembly in which a positive electrode plate and a negative electrode plate respectively coated with the positive electrode active material and the negative electrode active material are disposed with a separator being interposed between them, and an exterior, namely a battery case, which seals and accommodates the electrode assembly together with an electrolyte.

Generally, a lithium secondary battery may be classified into a can-type secondary battery where the electrode assembly is included in a metal can and a pouch-type battery where the electrode assembly is included in a pouch of an aluminum laminate sheet, depending on the shape of the exterior.

Recently, secondary batteries are widely used not only for small-sized devices such as cellular phones but also middle-sized or large-sized devices such as vehicles and power storages. In particular, along with the exhaustion of carbon energy and the increased interest on environments, hybrid electric vehicles and electric vehicles attract attention globally, for example in US, Europe, Japan and Korea. In such a hybrid electric vehicle or electric vehicle, a battery pack for giving a driving force to a vehicle motor is the most essential part. Since a hybrid electric vehicle or electric vehicle may obtain a driving force by means of charging and discharging of the battery pack, the hybrid electric vehicle or electric vehicle ensures excellent fuel efficiency and exhausts no or reduced pollutants, and for this reason, hybrid electric vehicles and electric vehicles are used more and more. In addition, the battery pack of the hybrid electric vehicle or electric vehicle includes a plurality of secondary batteries, and the plurality of secondary batteries are connected to each other in series or in parallel to improve capacity and output.

Generally, a battery pack includes a cell assembly configured by stacking a plurality of secondary batteries, a sensing assembly for sensing voltages of the secondary batteries of the cell assembly, and a pack housing configured to accommodate the cell assembly and the sensing assembly in an inner space thereof. In addition, in order to assemble the battery pack as described above, the cell assembly to which the sensing assembly is coupled may be accommodated in the inner space of the pack housing. Here, the pack housing may be formed with material and structure having so sufficient rigidity to protect components such as the cell assembly and the sensing assembly, accommodated in the inner space, against external physical factors, as a case of the battery pack.

Meanwhile, the cell assembly may be coupled to the pack housing by combining its lower portion with the lower portion of the inner space of the pack housing. For this, the cell assembly should be placed at a specific location in the inner space of the pack housing. However, in an existing battery pack, it is not easy to accurately position the cell assembly in the pack housing for assembling between the cell assembly and the pack housing. In particular, since a space between an inner side surface of the pack housing and an outer side surface of the cell assembly is very small, once the cell assembly is accommodated in the inner space of the pack housing, it is not easy to move the cell assembly to an accurate location. Moreover, if the cell assembly is erroneously located in the inner space of the pack housing and is thus moved to a correct location, the cell assembly or the pack housing may be damaged.

SUMMARY OF THE INVENTION

The present disclosure is designed to solve the problems of the related art, and therefore the present disclosure is directed to providing a battery pack, which may allow easy assembling of a cell assembly and a pack housing and have reinforced rigidity, and a vehicle comprising the same.

Other objects and advantages of the present disclosure will be understood from the following descriptions and become apparent by the embodiments of the present disclosure. In addition, it is understood that the objects and advantages of the present disclosure may be implemented by components defined in the appended claims or their combinations.

In one aspect of the present disclosure, there is provided a battery pack, comprising: a cell assembly including a plurality of secondary batteries and having outer protrusions formed at an outer side surface thereof to extend vertically; and a pack housing configured to have an inner space in which the cell assembly is accommodated, the pack housing having inner protrusions formed at an inner side surface thereof to extend vertically.

Preferably, the outer protrusions and the inner protrusions may be inserted and coupled to each other by means of sliding.

Also preferably, the inner protrusion of the pack housing may be inserted between two adjacent outer protrusions among the outer protrusions of the cell assembly.

Also preferably, the outer protrusion of the cell assembly may be inserted between two adjacent inner protrusions among the inner protrusions of the pack housing.

Also preferably, the inserted and coupled configuration of the outer protrusions and the inner protrusions may be provided in plural.

Also preferably, the outer protrusions and the inner protrusions may come into contact with each other at two or more portions.

Also preferably, the outer protrusions of the cell assembly may come into contact with the inner side surface of the pack housing, and the inner protrusions of the pack housing may come into contact with the outer side surface of the cell assembly.

Also preferably, the inner protrusions may be formed at both side surfaces of the pack housing, which are long and face each other, among inner side surfaces thereof.

Also preferably, the inner protrusion may be configured to have a gradually increasing protrusion length from an upper portion to a lower portion thereof, at least partially.

Also preferably, the cell assembly may have ducts provided at both side surfaces thereof so that fluid flows into or out of a secondary battery, and the outer protrusions may be formed at outer side surfaces of the ducts.

Also preferably, an outlet and an inlet of the duct may be formed to protrude upwards and outwards at the cell assembly, and the pack housing may include a placing portion formed at an upper portion of the side surface at which the inner protrusion is formed, so that the outlet and the inlet of the duct are placed thereon.

Also preferably, the battery pack according to present disclosure may further include a sensing assembly provided at one side of the cell assembly to sense a voltage of the secondary battery.

Also preferably, the battery pack according to present disclosure may further include an electronic component plate provided at an upper portion of the sensing assembly to include a battery management system (BMS).

In other aspect of the present disclosure, there is also provided a vehicle, which comprises the battery pack according to the present disclosure.

According to one embodiment of the present disclosure, since protrusions respectively provided at the cell assembly and the pack housing improve rigidity, the battery pack may ensure sufficient rigidity as a whole.

Therefore, even though external impacts or vibrations are applied to the battery pack, it is possible to prevent the cell assembly or the pack housing provided at the battery pack from being damaged.

In particular, a battery pack for a vehicle may be frequently exposed to vibrations or impacts due to its use environments, and the battery pack according to the present disclosure may be suitably applied as the battery pack for a vehicle since it is not easily damaged due to external vibrations or impacts.

In addition, in one embodiment of the present disclosure, the protrusions respectively provided at the cell assembly and the pack housing may give a guiding function while the cell assembly and the pack housing are assembled.

Therefore, in this embodiment of the present disclosure, if the protrusions at the cell assembly and the pack housing are matched while the cell assembly is accommodated in the inner space of the pack housing, the accommodation locations are fit automatically, and thus it is not needed to give a serious effort to match the accommodation locations for coupling or the like.

Further, if the cell assembly is not accurately positioned in the inner space of the pack housing, the cell assembly should be moved in a state of being accommodated in the pack housing, which is a difficult work and may damage the battery pack. However, in the present disclosure, while the cell assembly is accommodated in the pack housing, the cell assembly may be accurately positioned therein simultaneously. Therefore, any difficulty or danger occurring while moving the cell assembly may not occur.

BRIEF DESCRIPTION OF THE DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION OF THE INVENTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
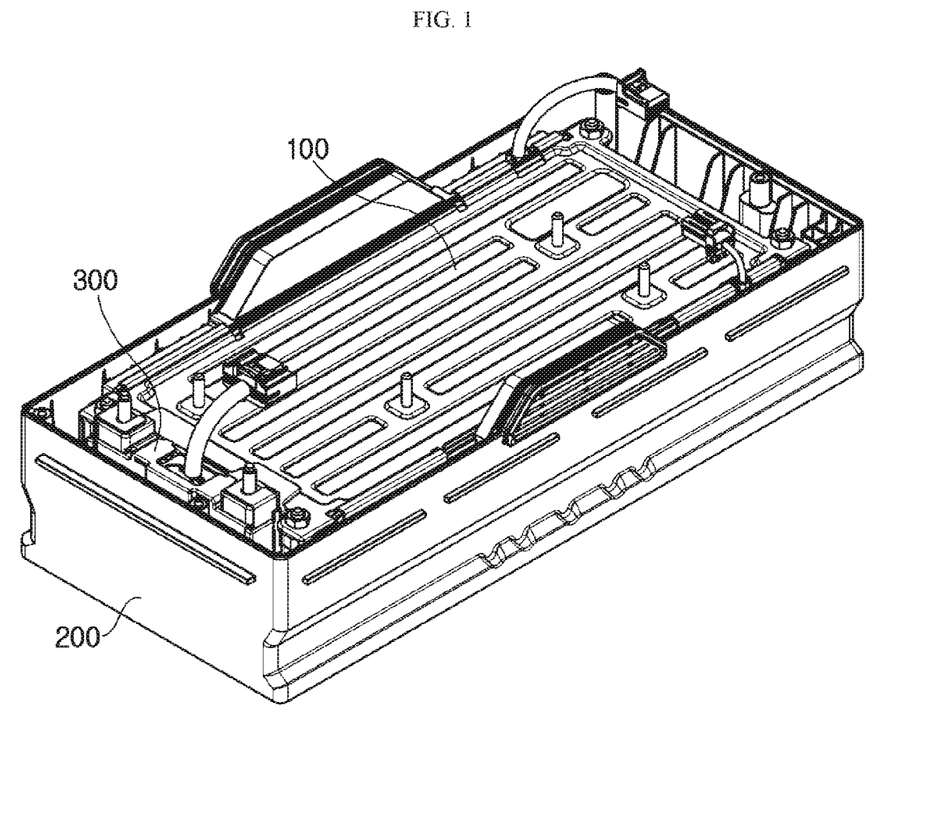
FIG. 1 is an assembled perspective view schematically showing a battery pack according to an embodiment of the present disclosure.
Figure 2:
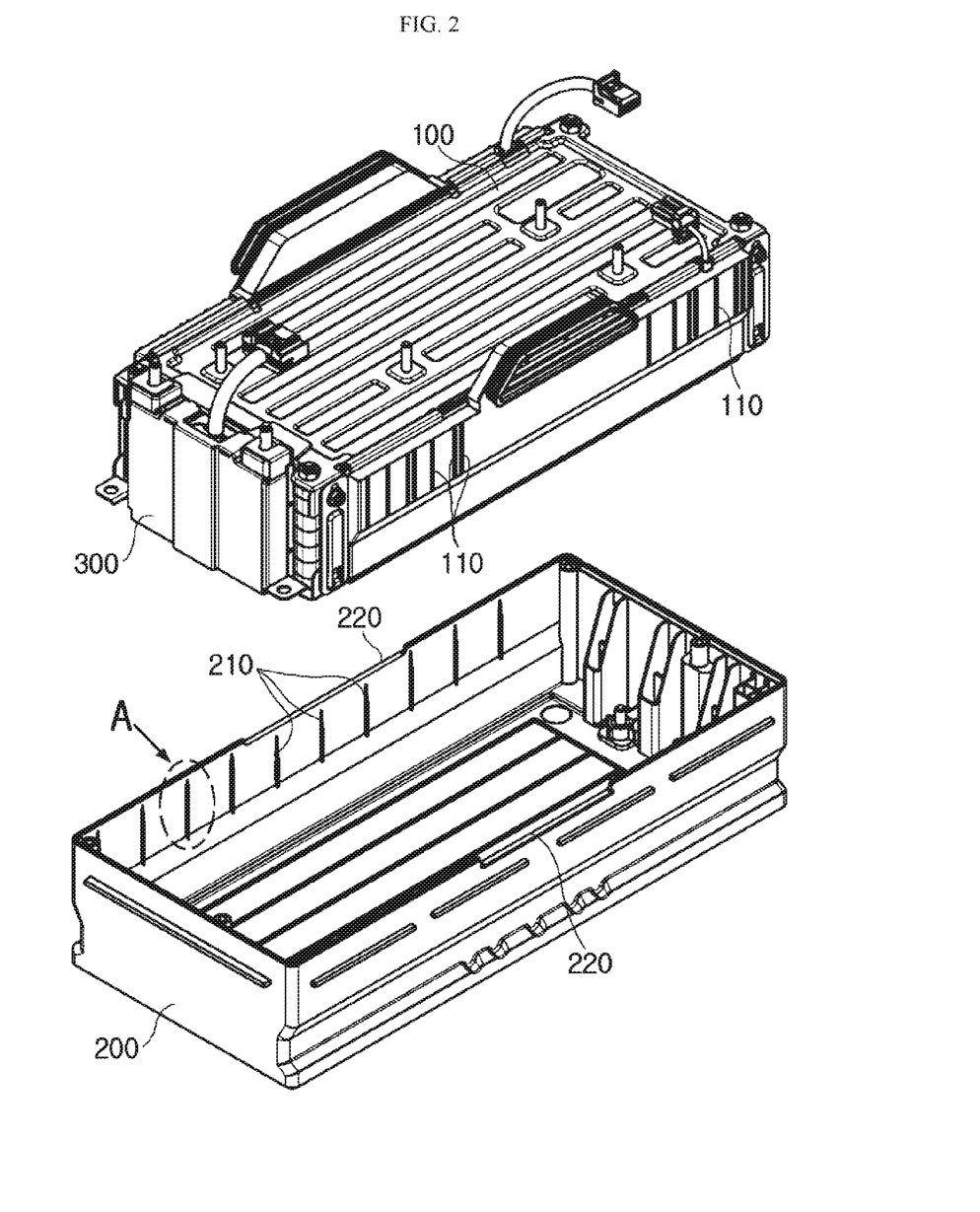
FIG. 2 is an exploded perspective view of FIG. 1.
Figure 3:
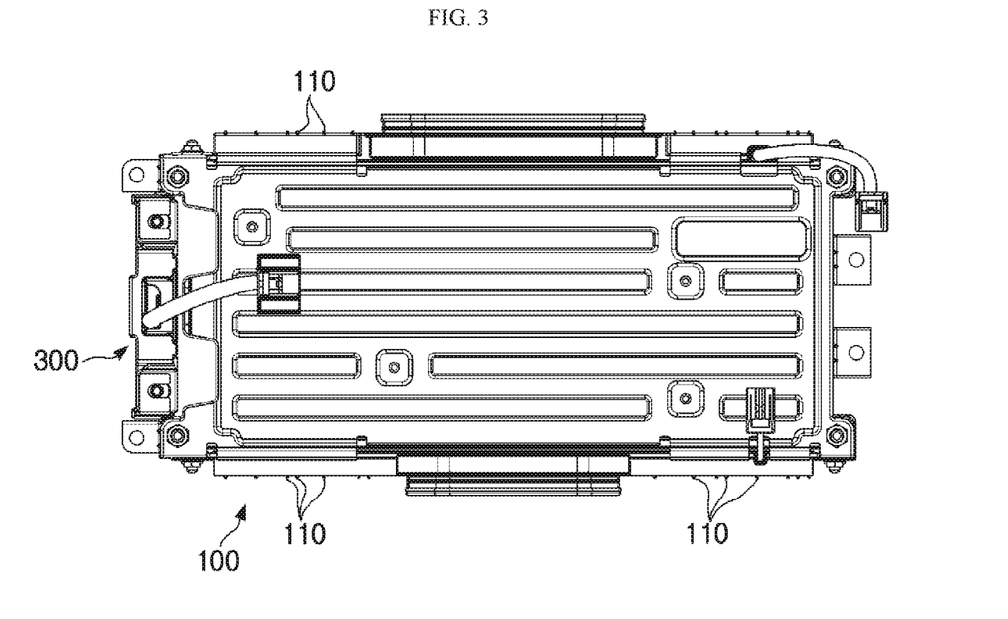
FIG. 3 is a top view schematically showing the configuration of a cell assembly, in the configuration of FIG. 1.
Figure 4:
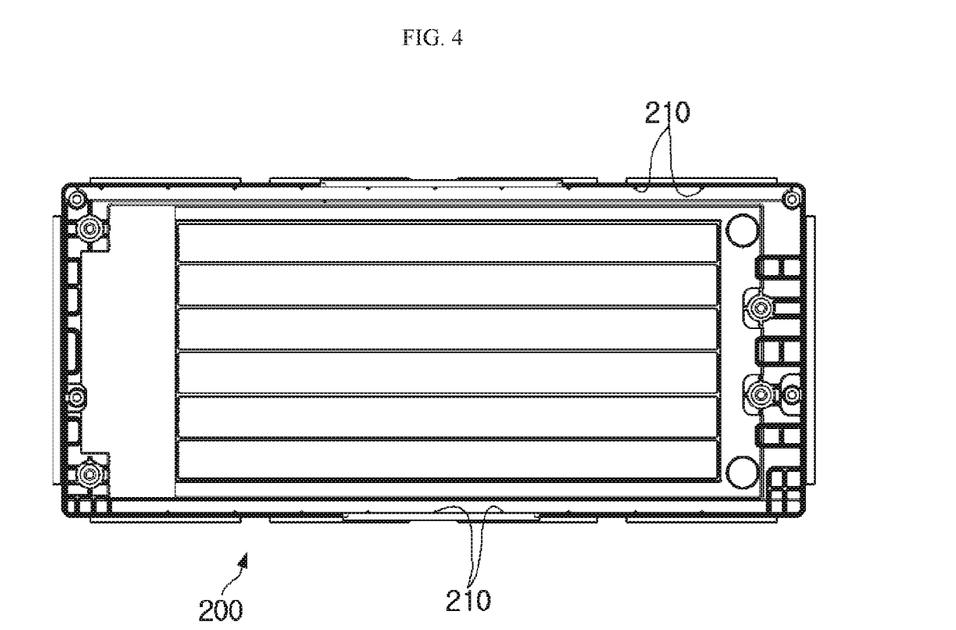
FIG. 4 is a top view schematically showing the configuration of a pack housing, in the configuration of FIG. 1.

FIG. 1 is an assembled perspective view schematically showing a battery pack according to an embodiment of the present disclosure, and FIG. 2 is an exploded perspective view of FIG. 1. In addition, FIG. 3 is a top view schematically showing the configuration of a cell assembly 100, in the configuration of FIG. 1, and FIG. 4 is a top view schematically showing the configuration of a pack housing 200, in the configuration of FIG. 1.

Referring to FIGS. 1 to 4, a battery pack according to the present disclosure includes a cell assembly 100 and a pack housing 200.

The cell assembly 100 includes a plurality of secondary batteries. Here, the plurality of secondary batteries may be pouch-type secondary batteries, and such pouch-type secondary batteries may configure the cell assembly 100 in a state of being stacked in one direction, for example vertically on the figures.

The cell assembly 100 may include a stacking frame for stacking a plurality of secondary batteries. The stacking frame is a component used for stacking secondary batteries, and the stacking frame may hold secondary batteries to prevent shaking of the secondary batteries, and many stacking frames may be stacked with each other to guide assembling of secondary batteries. The stacking frame may also be called with various terms, for example a cartridge, and may have a rectangular ring shape with a hollow center. In this case, four edges of the stacking frame may be located at the outer circumference of a pouch-type secondary battery, respectively.

In particular, in the present disclosure, the cell assembly 100 has an outer protrusion 110 formed at an outer side surface thereof to extend vertically. In other words, the cell assembly 100 has the outer protrusion 110 formed at the outer side surface thereof to protrude in an outer direction of the cell assembly 100, and the outer protrusion 110 may be formed to extend long in a direction perpendicular to the ground.

In addition, at least two outer protrusions 110 may be formed at the side surface of the cell assembly 100. If a plurality of outer protrusions 110 are formed at the outer surface of the cell assembly 100 as described above, the rigidity of the cell assembly 100 may be improved. Therefore, even though impacts or vibrations are applied from the outside of the cell assembly 100 to the cell assembly 100, it is possible to eliminate, or at least reduce, a damage of the cell assembly 100.

An empty space is formed in the pack housing 200, and the cell assembly 100 may be accommodated in the inner space. Since the pack housing 200 may play a role of an exterior of the battery pack, the pack housing 200 may give structural stability to the battery pack and protect components such as the cell assembly 100 accommodated therein against external physical factors such as impacts or substances. For this, the pack housing 200 may be made of metal material such as steel.

In particular, in the present disclosure, the pack housing 200 has an inner protrusion 210 formed at an inner side surface thereof to extend vertically. In other words, the pack housing 200 may have the inner protrusion 210 formed at the side surface of the inner space, in which the cell assembly 100 is accommodated, to protrude inwards, and the inner protrusion 210 may be formed to extend long in a direction perpendicular to the ground.

As described above, in the battery pack according to the present disclosure, since the inner protrusion 210 is formed at the pack housing 200, the rigidity of the pack housing 200 may be improved. Therefore, even though impacts or vibrations are applied from the outside or inside of the pack housing 200 to the pack housing 200, it is possible to eliminate, or at least reduce, a damage of the pack housing 200. In particular, the pack housing 200 may have a plurality of inner protrusions 210, and in this case, the pack housing 200 may have more improved rigidity.

Preferably, the outer protrusion 110 of the cell assembly and the inner protrusion 210 of the pack housing may be inserted and coupled to each other by means of sliding. This will be described in more detail with reference to FIGS. 5 to 9.

Figure 5:
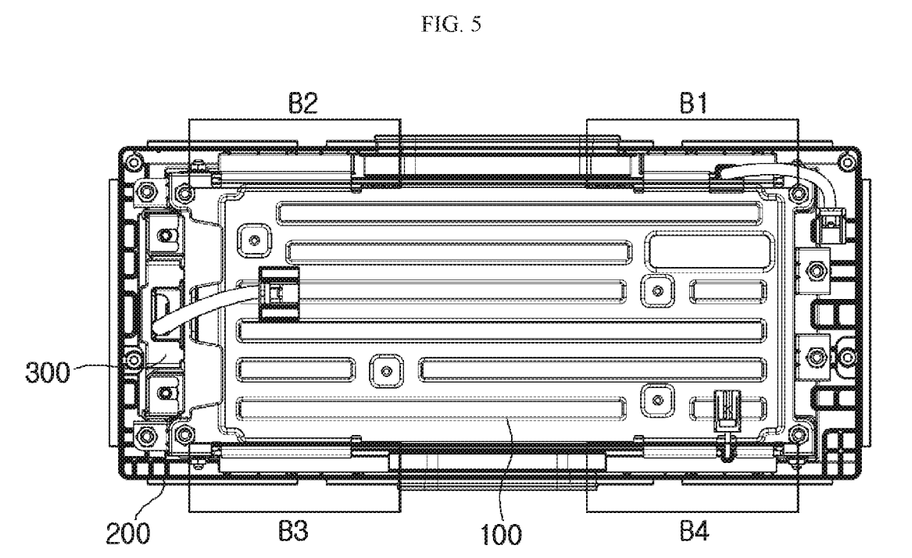
FIG. 5 is a top view showing the configuration of FIG. 1.
Figure 6:
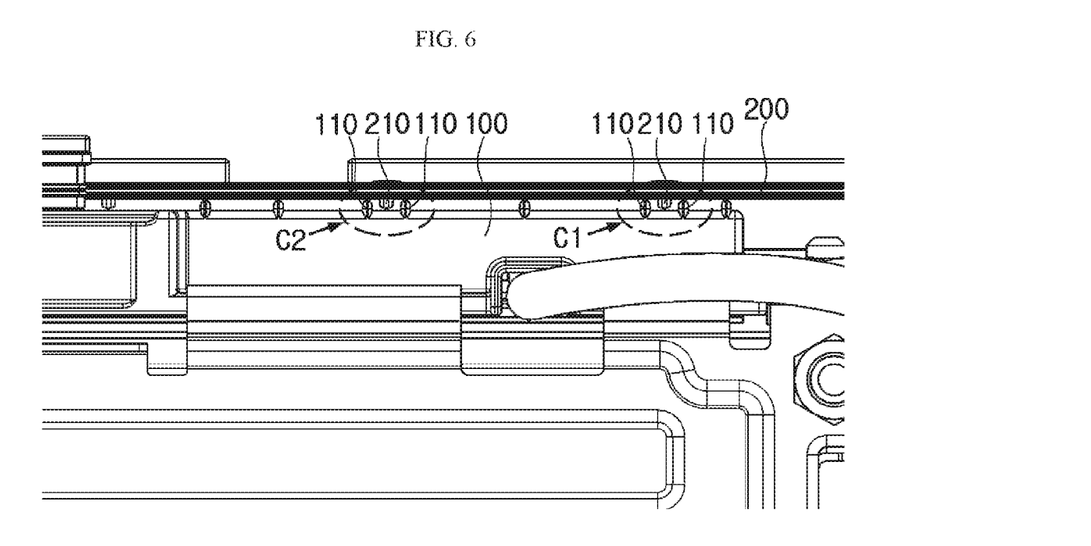
FIGS. 6 to 9 are enlarged view showing portions B1 to B4 of FIG. 5, respectively.
Figure 7:
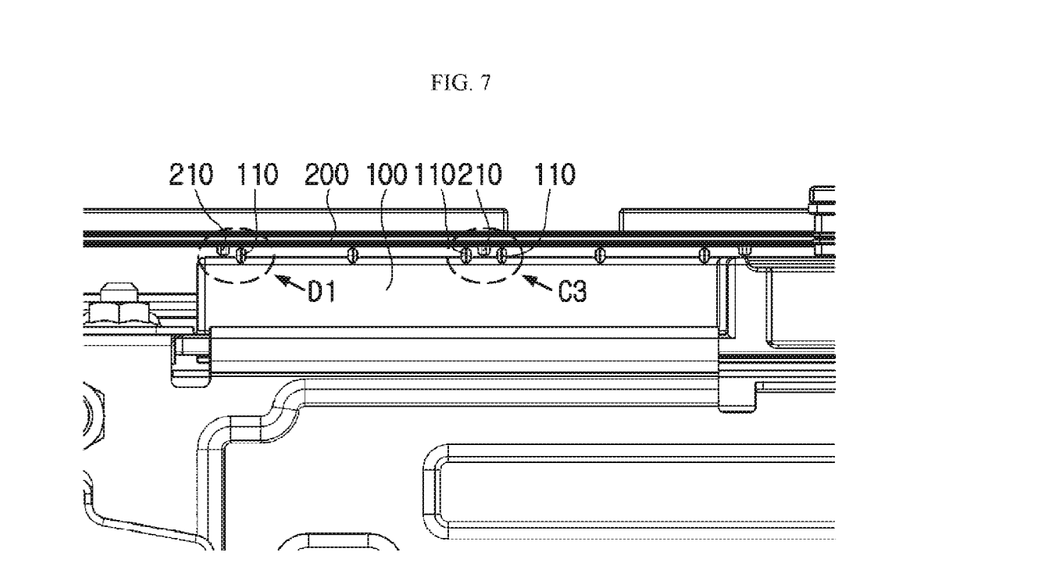
Figure 8:
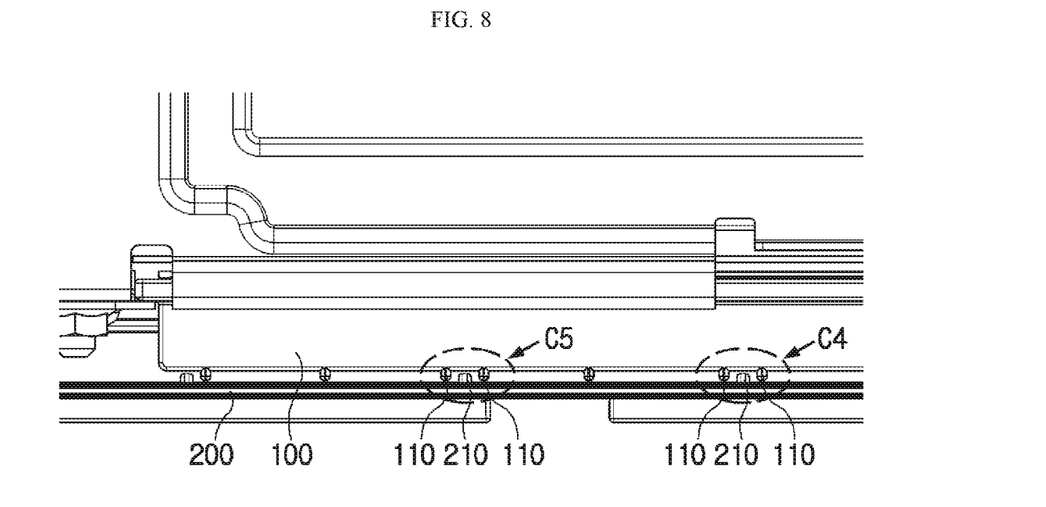
Figure 9:
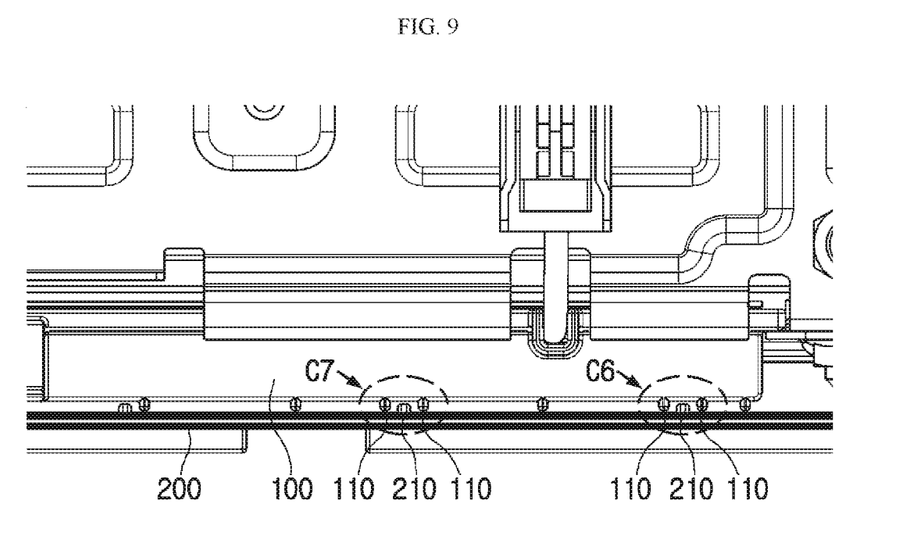

FIG. 5 is a top view showing the configuration of FIG. 1, and FIGS. 6 to 9 are enlarged view showing portions B1 to B4 of FIG. 5, respectively.

Referring to FIGS. 5 to 9, the inner protrusion 210 of the pack housing may be inserted between two or more adjacent outer protrusions 110, among the outer protrusions 110 of the cell assembly, so that the outer protrusion 110 and the inner protrusion 210 are coupled to each other.

In other words, as indicated by C1 to C7 in FIGS. 6 to 9, among the plurality of outer protrusions 110 provided at the cell assembly 100, at least some outer protrusions 110 may be arranged so that two adjacent outer protrusions 110 are spaced by a predetermined distance to form a groove between them. In addition, the inner protrusion 210 of the pack housing may be inserted into the groove formed between two adjacent outer protrusions 110.

In particular, the groove between the outer protrusions 110 is formed to extend long in a vertical direction, and the inner protrusion 210 inserted into the groove is also formed to extend long in a vertical direction. For this reason, the inner protrusion 210 may be inserted into the groove between the outer protrusions 110 in a sliding way. In other words, in a state where the lower end of the inner protrusion 210 of the pack housing is located at the upper end of the groove between the outer protrusions 110 of the cell assembly, if the cell assembly 100 is accommodated in the inner space of the pack housing 200, the inner protrusion 210 of the pack housing slides in a state of being fitted into the groove between the outer protrusions 110 of the cell assembly, so that the outer protrusions 110 and the inner protrusion 210 are coupled to each other by insertion.

Therefore, in this embodiment of the present disclosure, the cell assembly 100 may be inserted into the inner accommodation space of the pack housing 200 in a state where the inner protrusion 210 of the pack housing is fitted into the groove between the outer protrusions 110 of the cell assembly, and thus the outer protrusions 110 and the inner protrusion 210 may serve as a guide while the cell assembly 100 is being accommodated into the pack housing 200.

Meanwhile, a spacing distance between two outer protrusions 110 forming a groove may be equal to or greater than a lateral length of the inner protrusion 210 so that the inner protrusion 210 of the pack housing may be easily inserted into the groove. However, the spacing distance between the outer protrusions 110 may not be seriously great, so that coupling locations of the inner protrusion 210 and the outer protrusions 110 may be easily set. For example, the spacing distance between two outer protrusions 110 forming a groove may be one time or more and two time or less of the lateral length of the inner protrusion 210 inserted therein.

Preferably, the coupling configuration of the outer protrusion 110 and the inner protrusion 210 may be provided in plural at a single battery pack, as shown in FIGS. 5 to 9.

For example, the groove between two outer protrusions 110 into which the inner protrusion 210 of the pack housing is to be inserted may be two or more at a single cell assembly 100, as indicated by C1 to C7 in the figures, and the inner protrusion 210 inserted into the grooves between a plurality of outer protrusions 110 may also be two or more at a single pack housing 200.

In this configuration of the present disclosure, since there are several configurations capable of guiding the cell assembly 100 to be accommodated in the pack housing 200, this accommodation process may be performed more easily. In addition, in this case, since a distance between adjacent outer protrusions 110 forming a groove may be increased further, the cell assembly 100 may be accommodated in the pack housing 200 more smoothly.

Also preferably, the outer protrusion 110 and the inner protrusion 210 may be configured to contact each other at two or more portions.

For example, when the inner protrusion 210 of the pack housing is inserted into the groove between the outer protrusions 110 of the cell assembly, both sides of the inner protrusion 210 may contact two outer protrusions 110 forming the groove, respectively. In other words, in the portion C1 of FIG. 6, a left end of the inner protrusion 210 may come into contact with a right side of the outer protrusion 110 located at a left side, and a right end of the inner protrusion 210 may come into contact with a left side of the outer protrusion 110 located at a right side.

In this configuration of the present disclosure, since a lateral movement is restricted in a state where the inner protrusion 210 of the pack housing is inserted between the outer protrusions 110 of the cell assembly, the insertion location of the cell assembly 100 may not be changed but be fixed to a single point. Therefore, the insertion location of the cell assembly 100 with respect to the pack housing 200 may be more accurate, and after the cell assembly 100 is inserted, it is possible to prevent the cell assembly 100 from moving in the pack housing 200. Therefore, while a battery pack is being fabricated or a fabricated battery pack is being used, even though vibrations or impacts are applied to the battery pack, the cell assembly 100 does not move, and thus it can be effectively prevented that the assembling location of the cell assembly 100 is in disorder or the battery pack is damaged.

Meanwhile, the contacting configuration of the outer protrusion 110 and the inner protrusion 210 may also be applied even though the inner protrusion 210 of the pack housing is not inserted into the groove between the outer protrusions 110 of the cell assembly.

In particular, for the contacting configuration between the outer protrusion 110 of the cell assembly and the inner protrusion 210 of the pack housing, a single outer protrusion 110 and a single inner protrusion 210 may come into contact with each other in a direction of the side surface. For example, in the portion D1 of FIG. 7, a left portion of the outer protrusion 110 of the cell assembly may come into contact with a right portion of the inner protrusion 210 of the pack housing.

However, in this configuration, the movement of the cell assembly 100 is restricted just in one direction, and thus the movement in the other direction may be restricted by using another contacting configuration. For example, in FIG. 7, the contacting configuration of the outer protrusion 110 and the inner protrusion 210 at the portion D1 may restrict a movement of the cell assembly 100 in a left direction, and the contacting configuration of the outer protrusion 110 and the inner protrusion 210 at the portion C3 may restrict a movement of the cell assembly 100 in a right direction.

Also preferably, the outer protrusion 110 of the cell assembly may come into contact with the inner side surface of the pack housing 200, and the inner protrusion 210 of the pack housing may come into contact with the outer side surface of the cell assembly 100. For example, in the configuration of FIG. 6, an outer end (an upper end in FIG. 6) of the outer protrusion 110 formed at the cell assembly 100 may come into contact with an inner side surface (a lower surface in FIG. 6) of the pack housing 200. In addition, an inner end (a lower surface in FIG. 6) of the inner protrusion 210 of the pack housing may come into contact with an outer surface (an upper surface in FIG. 6) of the cell assembly 100.

In this configuration of the present disclosure, the assembling location of the pack housing 200 and the cell assembly 100 becomes more accurate, and the movement of the cell assembly 100 accommodated in the pack housing 200 is restricted, thereby preventing the battery pack from being damaged. For example, in FIG. 6, within the pack housing 200, a movement of the cell assembly 100 in an inner and outer direction (a vertical direction in FIG. 6) may be restricted.

Also preferably, the inner protrusion 210 of the pack housing may be formed at both side surfaces which have a great length and face each other, among inner side surfaces of the pack housing 200. For example, as shown in FIG. 3, the pack housing 200 may be formed to have a rectangular shape, when being observed from the above, and at this time, the inner protrusion 210 may be formed at two long sides (upper and lower sides in FIG. 3) facing each other. In this case, the outer protrusion 110 of the cell assembly may also be formed at two long sides to correspond to the inner protrusion 210.

In this configuration of the present disclosure, more protrusions may be formed at the pack housing 200 and the cell assembly 100. Therefore, the pack housing 200 and the cell assembly 100 may ensure more sufficient rigidity, and protrusions serving as a guide are coupled at more portions, which may facilitate easier assembling of the pack housing 200 and the cell assembly 100.

Also preferably, the inner protrusion 210 of the pack housing and/or the outer protrusion 110 of the cell assembly may have a protrusion length which gradually increases from an upper portion to a lower portion thereof, at least partially. This will be described in more detail with reference to FIG. 10.

Figure 10:
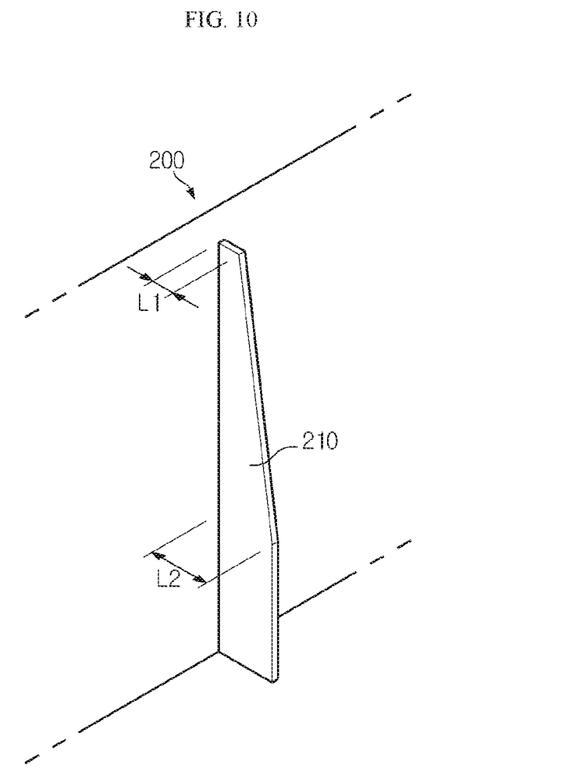
FIG. 10 is an enlarged view schematically showing a portion A of FIG. 2.

FIG. 10 is an enlarged view schematically showing a portion A of FIG. 2.

Referring to FIG. 10, a protrusion length at an upper portion of the inner protrusion 210 of the pack housing 200 may be assumed as L1, and the inner protrusion 210 may be formed to have a gradually increasing protrusion length in a downward direction. Therefore, at a predetermined point, the inner protrusion 210 may have a protrusion length of L2, and at this time, the following relation is obtained: L2>L1.

In this configuration of the present disclosure, while the cell assembly 100 is being accommodated in the inner space of the pack housing 200, it is possible to prevent the outer surface of the cell assembly 100 from being damaged by the inner protrusion 210 of the pack housing. In other words, in the configuration of FIG. 10, if the top end of the inner protrusion 210 protrudes long from the first, while the cell assembly 100 is being inserted into the pack housing 200, the outer surface of the cell assembly 100 may be damaged by an upper edge of the inner protrusion 210. However, in this embodiment, such a damage problem may be prevented. Moreover, such a damage may also occur when vibrations or impacts are applied to the battery pack after the cell assembly 100 is inserted into the pack housing 200. However, if the top end of the inner protrusion 210 protrudes less as in this embodiment, even though external vibrations or impacts are applied, it may be effectively prevented that the outer surface of the cell assembly 100 is damaged by the inner protrusion 210.

Preferably, the cell assembly 100 may include ducts provided at both side surfaces thereof so that fluid may flow into or out of the secondary battery. For example, as shown in FIG. 2, the cell assembly 100 may have ducts respectively at a left surface (an upper side in FIG. 3) and a right surface (a lower side in FIG. 3). Here, the duct is a component for allowing fluid to flow into or out of a secondary battery located in the cell assembly 100. Therefore, the duct has an empty space therein to serve as a channel, and also has an inlet for introducing fluid into the empty space or an outlet for discharging fluid from the empty space.

The secondary battery provided in the cell assembly 100 may exchange heat with external fluid, for example external air, out of the battery pack through the duct. Therefore, the cell assembly 100 may allow external air to be introduced into the cell assembly 100 through the inlet duct so that external air may flow around the secondary battery, and thus the external air may exchange heat with the secondary battery so that the secondary battery is cooled. After that, the air heated while flowing around the secondary battery may be discharged out of the cell assembly 100 through the outlet duct.

As described above, in the configuration where ducts are provided at both side surfaces of the cell assembly 100, the outer protrusion 110 of the cell assembly may be provided at an outer surface of the duct.

In this configuration of the present disclosure, the cell assembly 100 may have improved rigidity with respect to the ducts. In particular, since the duct has an empty space therein as a channel, the cell assembly 100 may have somewhat weak rigidity thereat. However, in this embodiment, since the outer protrusion 110 is formed at the outer portion of the duct, the protrusion may improve rigidity of the duct. Therefore, the cell assembly 100 may ensure stable rigidity as a whole, and thus it is possible to prevent the cell assembly 100 from being damaged due to external vibrations or impacts.

Meanwhile, in the configuration where the ducts are provided at both side surfaces of the cell assembly 100, the outlet and the inlet of the ducts may be formed to protrude from the cell assembly 100 upwards and outwards. In other words, the cell assembly 100 is accommodated in the inner space of the pack housing 200, and for ensuring fluid to stably flow in or out through the duct, the outlet and the inlet of the duct may be exposed out of the pack housing 200. Therefore, the outlet and the inlet of the duct may be configured to protrude higher than the upper portion of the cell assembly 100 as shown in FIG. 2, and also to protrude broader than the side surface of the cell assembly 100 as shown in FIG. 3.

In this case, the pack housing 200 may have a placing portion 220 formed at an upper portion of the side surface thereof where the inner protrusion 210 is formed, so that the outlet and the inlet of the duct are placed thereon. Therefore, the outlet and the inlet of the duct may be placed on the placing portion 220 of the pack housing 200, and thus the outlet and the inlet of the duct may be stably supported upwards.

In particular, in the present disclosure, since the configuration where the inner protrusion 210 of the pack housing and the outer protrusion 110 of the cell assembly are inserted and coupled to each other may guide an accommodation location of the cell assembly 100 in the inner space of the pack housing 200, the outlet and the inlet of the duct may be accurately placed on the placing portion 220 of the pack housing 200.

Meanwhile, even though it has been illustrated in the drawings and embodiments that the inner protrusion 210 of the pack housing is inserted between two outer protrusions 110 provided at the cell assembly 100, the present disclosure is not limited thereto. In other words, the battery pack according to the present disclosure may also be configured so that a groove is formed between two inner protrusions 210 provided at the pack housing 200, and the outer protrusion 110 of the cell assembly is inserted into the groove. In this case, the features explained above based on the configuration where the inner protrusion 210 is inserted between the outer protrusions 110 may also be applied to a configuration where the outer protrusion 110 is inserted between the inner protrusions 210.

In addition, even though FIG. 2 illustrates that the pack housing 200 has an open upper portion, the pack housing 200 may further include a lid for covering the open upper portion.

Preferably, as shown in the figures, the battery pack according to the present disclosure may further include a sensing assembly 300. The sensing assembly 300 may be provided at one side of the cell assembly 100 to sense a voltage of a secondary battery included in the cell assembly 100. In particular, the sensing assembly 300 may be respectively connected to both ends of every secondary battery provided at the cell assembly 100 to sense a voltage of every secondary battery.

Also preferably, the battery pack according to the present disclosure may further include an electronic component plate at an upper portion of the sensing assembly 300. The electronic component plate may have a plate shape on which electronic components are mounted. At this time, the electronic components may include a Battery Management System (BMS), a current sensor, a relay, a fuse or the like.

The battery pack according to the present disclosure may be applied to a vehicle such as an electric vehicle and a hybrid vehicle. In other words, the vehicle according to the present disclosure may include the battery pack according to the present disclosure as described above. The battery pack according to the present disclosure may be easily assembled and not easily damaged due to vibrations or impacts, and thus the battery pack according to the present disclosure may be more effectively applied to a vehicle which may be frequently exposed to vibrations or impacts.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or a shape in which an object is placed.

What is claimed is:

1. A battery pack, comprising:
 a cell assembly including a plurality of secondary batteries and having outer protrusions formed at an outer side surface thereof to extend vertically; and
 a pack housing configured to have an inner space in which the cell assembly is accommodated, the pack housing having inner protrusions formed at an inner side surface thereof to extend vertically, wherein the cell assembly has ducts provided at both side surfaces thereof so that fluid flows into or out of a secondary battery, and the outer protrusions are formed at outer side surfaces of the ducts.

2. The battery pack according to claim 1,
wherein the outer protrusions and the inner protrusions are inserted and coupled to each other by means of sliding.

3. The battery pack according to claim 2,
wherein the inner protrusion of the pack housing is inserted between two adjacent outer protrusions among the outer protrusions of the cell assembly.

4. The battery pack according to claim 2,
wherein the outer protrusion of the cell assembly is inserted between two adjacent inner protrusions among the inner protrusions of the pack housing.

5. The battery pack according to claim 2,
wherein the inserted and coupled configuration of the outer protrusions and the inner protrusions is provided in plural.

6. The battery pack according to claim 2,
wherein the outer protrusions and the inner protrusions come into contact with each other at two or more portions.

7. The battery pack according to claim 1,
wherein the outer protrusions of the cell assembly come into contact with the inner side surface of the pack housing, and the inner protrusions of the pack housing come into contact with the outer side surface of the cell assembly.

8. The battery pack according to claim 1,
wherein the inner protrusions are formed at both side surfaces of the pack housing, which are long and face each other, among inner side surfaces thereof.

9. The battery pack according to claim 1,
wherein the inner protrusion is configured to have a gradually increasing protrusion length from an upper portion to a lower portion thereof, at least partially.

10. The battery pack according to claim 1,
wherein an outlet and an inlet of the duct are formed to protrude upwards and outwards at the cell assembly, and
wherein the pack housing includes a placing portion formed at an upper portion of the side surface at which the inner protrusion is formed, so that the outlet and the inlet of the duct are placed thereon.

11. The battery pack according to claim 1, further comprising:
a sensing assembly provided at one side of the cell assembly, the sensing assembly being configured to sense a voltage of at least one secondary battery of the cell assembly.

12. The battery pack according to claim 1, further comprising:
an electronic component plate provided at an upper portion of the sensing assembly, the electronic component plate including a battery management system (BMS).

13. A vehicle, comprising the battery pack according to claim 1.

* * * * *